United States Patent Office 3,629,240
Patented Dec. 14, 1971

3,629,240
17β-(1-CYCLOALKENYL) OXY-2α,3α-EPITHIO-5α-ANDROSTANES
Taichiro Komeno, Osaka-shi, Japan, assignor to Shinogi & Co., Ltd., Osaka, Japan
No Drawing. Filed July 22, 1969, Ser. No. 843,759
Claims priority, application Japan, Aug. 26, 1968, 43/53,254
Int. Cl. C07c 173/00
U.S. Cl. 260—239.5          10 Claims

ABSTRACT OF THE DISCLOSURE

Hormonal (strong myogenic, anti-estrogenic, etc.) 17β-(1-cycloalkenyl)oxy-2α,3α-epithio-5α - androstane compounds of the formula:

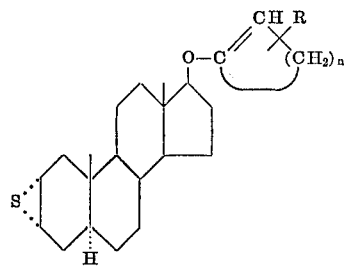

wherein R represents a hydrogen atom or a lower alkyl group and n is an integer of from 3 to 5, the medicine containing them and processes for preparation thereof.

---

The present invention relates to 17β-(1-cycloalkenyl) oxy-2α,3α-epithio-5α-androstanes, the medicine containing them as the active ingredients, and the processes for preparation thereof.

The steroidal moiety of the compounds is 2α,3α-epithio-5α-androstan-17β-ol, disclosed to have strong myogenic, anti-estrogenic and other activities ( e.g. our Japanese Patent No. 467,342). The cycloalkenyl moiety is a cycloalkenyl group derived from cyclopentanone, cyclohexanone or cycloheptanone optionally substituted by an alkyl group, in which the double bond locates at between positions 1 and 2 (e.g. Japanese Patent No. 434,094).

The novel compounds of the present invention are represented by the general formula:

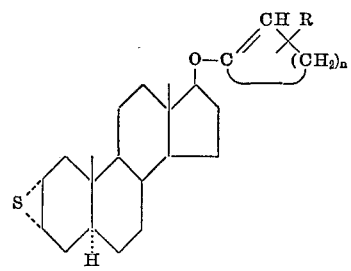

wherein R represents a hydrogen atom or a lower alkyl group, and n is an integer of from 3 to 5.

Representative of the compounds of the present invention involves, for example:

17β-(1-cyclopentenyl)oxy-2α,3α-epithio-5α-androstane,
17β-(1-cyclohexenyl)oxy-2α,3α-epithio-5α-androstane,
17β-(1-cycloheptenyl)oxy-2α,3α-epithio-5α-androstane,
17β-(3-methyl-1-cyclohexenyl)oxy-2α,3α-epithio-5α-androstane, and the like.

The novel compounds of the present invention are useful as medicine for their improved pharmacological activities, hormonic activities, anti-hormonic activities, especially myogenic and androgenic activities. The compounds are more active than the corresponding starting materials. Especially, 17β-(1-cyclopentenyl)oxy-2α,3α-epithio - 5α-androstane shows strong anti-estrogenic activity, myogenic activity, gonadotropin inhibiting activity, androgenic activity, anti-implantation activity and related activities. Moreover, it has improved ratio of myogenic activity and androgenic activity than the best known myogenic compound of the 2α,3α-epithio-5α-androstane series steroids, namely 17β-(1-methoxycyclopentyl)oxy-2α,3α-epithio-5α-androstane, in more than two fold. The similar relationship is observed in the case of 17β-(1-cyclohexenyl and cycloheptenyl)oxy-2α,3α-epithio-5α-androstanes.

The compounds of the Formula I can be prepared for oral or parenteral dosage forms, solely or in admixture with other co-acting substances. They may be administered with a pharmaceutical carrier which can be a solid material or a liquid material in which the compound is dissolved, dispersed or suspended. The solid compositions can take the forms of tablets, powders, pills, and the liquid compositions may take the forms of injections, ointments, dispersions, suspensions, solutions, emulsions, syrups or elixirs. They may be flavoured, colored, and tablets and granules may be coated. Diluents, coloring agents, aromatic substances, flavouring substances, bulking agents, binders, distintegrators, lubricants, ointment bases, solvents, solubilizing agents, buffers, and stabilizing agents may be used if the agents do not exert an adverse effect on the compounds.

One of the processes of the present invention for preparation of the compounds of the Formula I is carried out by the reaction of the starting material, 2α,3α-epithio-5α-androstan-17β-ol, with the functional derivatives of five to seven membered ring cycloaliphatic ketone, in the presence or absence of an acid capable of facilitating the ether formation and a suitable solvent, if required under the anhydrous condition, and if required under inert gas.

The functional derivatives of five to seven membered ring cycloaliphatic ketones are the compounds of the formula:

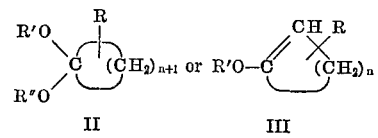

wherein R represents a hydroyen atom or a lower alkyl group; R' and R" each represents an alkyl group, benzyl group or a phenyl group, or R' and R" combined together represent a lower alkylene group; and n is an integer of from 3 to 5. Representative of the compounds involves:

1,1-dimethoxycyclopentane,
1,1-diethoxycyclopentane,
1,1-dipropoxycyclopentane,
1,1-dimethoxycyclohexane,
1,1-diethoxycyclohexane,
1,1-dipropoxycyclohexane,
1,1-dimethoxycycloheptane,
1,1-diethoxycycloheptane,
1,1-dipropoxycycloheptane,
1,1-dimethoxy-3-methylcyclohexane,
1-methoxycyclohexene,
1-ethoxycyclopentene,
1-propoxycyclopentene,
1-methoxycyclohexane,
1-ethoxycycloheptene, 1-propoxycyclohexene,
1-methoxycycloheptene,
1-ethoxycyclohepten,
1-phenoxycycloheptene,
1,1-ethylenedioxycyclopentane,
1,1-propylenedioxycyclohexane, and the like.

An acid capable of facilitating the ether formation is used for condensation of the agent with the steroid-17β-ol. This may be an acid e.g. p-toluenesulfonic acid, p-bromobenzenesulfonic acid, benzenesulfonic acid, hydrochloric acid, sulfuric acid, hydrobromic acid, and the like, and their salts with a weak base e.g. pyridine, collidine, quinoline, ammonia, alkylamines and the like. The suitable solvent involves a hydrocarbon e.g. petroleum benzine, heptane, isooctane, cyclohexane, benzene, toluene, xylene, and the like; a halogenated hydrocarbon e.g. chlorobenzene, carbon tetrachloride, methylene chloride, dichloroethane, chloroform, and the like; an ether e.g. diethyl ether, diisopropyl ether, dioxane, tetrahydrofuran, tetrahydropyran, and the like; an ester e.g. ethyl acetate, butyl acetate, ethyl benzoate, and the like; a ketone e.g. acetone, methyl ethyl ketone, diethyl ketone, cyclopentanone, cyclohexanone, cycloheptanone, and the like; an alcohol e.g. methanol, ethanol, propanol, butanol, pentanol, octanol, ethylene glycol, and the like; an organic base e.g. pyridine, collidine, lutidine, quinoline, and other solvents e.g. dimethylformamide, dimethylsulfoxide, or the mixture of the solvents cited above. The reaction is carried out preferably at temperature of range from 50° C. to 100° C., and generally it takes from 30 minutes to two days for completion of the reaction. The cycloalkenyl steroid-17-yl ethers are generally prepared by heating at about 120° C. to 180° C. In the case of the process of the present invention, however, the temperature is lowered in order to prevent decomposition of 2α,3α-epithio group. The reaction is preferably carried out under inert gas e.g. nitrogen, argon, and the like, or if required, the solvent of the reaction mixture is removed gradually from the reaction mixture by azeotropic distillation or fractional distillation, especially when the reagent is a compound of the Formula II to remove the substance formed in the course of the reaction. The reaction of the present process proceeds through intermediates, 17β - (1 - oxygenated cycloalkyl)oxy - 2α,3α-epithio - 5α - androstanes which is then transformed to the compound of the Formula I by heating.

The alternative process of the present invention utilizes the intermediates of the former process as the starting materials which are heated to form the compounds of the Formula I. The starting materials of the process are the compounds of the formula:

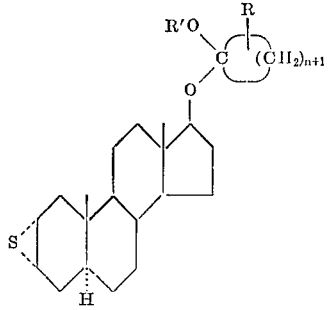

wherein R represents a hydrogen atom or a lower alkyl group, R' represents an alkyl group, benzyl group or a phenyl group, and $n$ is an integer of from 3 to 5. Representative of the starting materials involves:

17β-(1-methoxycyclopentyl)oxy-2α,3α-epithio-5α-androstane,
17β-(1-ethoxycyclopentyl)oxy-2α,3α-epithio-5α-androstane,
17β-(1-propoxycyclopentyl)oxy-2α,3α-epithio-5α-androstane,
17β-(1-methoxycyclohexyl)oxy-2α,3α-epithio-5α-androstane,
17α-(1-ethoxycyclohexyl)oxy-2α,3α-epithio-5α-androstane,
17β-(1-propoxycyclohexyl)oxy-2α,3α-epithio-5α-androstane,
17β-(1-methoxycycloheptyl)oxy-2α,3α-epithio-5α-androstane,
17β-(1-ethoxycycloheptyl)oxy-2α,3α-epithio-5α-androstane,
17β-(1-methoxy-3-methylcyclohexyl)oxy-2α,3α-epithio-5α-androstane,
17β-(1-benzyloxycyclopentyl)oxy-2α,3α-epithio-5α-androstane,
17β-(1-phenoxycyclohexyl)oxy-2α,3α-epithio-5α-androstane, and the like. The heating preferably at from 50° C. to 100° C. for 30 minutes to two days can be carried out in an aprotic solvent e.g. a hydrocarbon, halogenated hydrocarbon, ether, ester, ketone, or other organic solvents, in the absence or presence of a catalyzer such as an acid e.g. p-toluenesulfonic acid, p-bromobenzenesulfonic acid, benzenesulfonic acid, sulfuric acid, hydrobromic acid, or the like, their salts with a weak base e.g. pyridine, collidine, quinoline, ammonia, alkylamines or the like, or an organic base e.g. pyridine, collidine, quinoline, alkylamines or the like, if required in an inert gas. The product is isolated from the reaction mixture by the general methods of organic chemistry. As the product is sensitive to aqueous acid, the amount of catalyzer should preferably be smaller to avoid complicated treatment in the working up of the reaction mixture, and the reaction are preferably carried out under anhydrous condition. The elimination of alcohol group by heat from the starting material to form the compound of the Formula I is a kind of thermal decomposition which takes place at lower temperature without decomposition of heat-sensitive 2α,3α-epithio group.

In order that the invention may be more fully understood, it will now be described, though only by way of illustration, with reference to the following example.

EXAMPLE 1

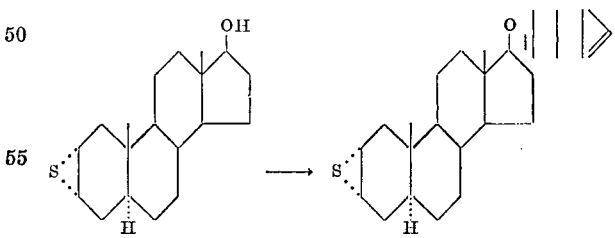

To a solution of 2.0 g. of 2α,3α-epithio-5α-androstan-17β-ol in 60 ml. of carbon tetrachloride are added 20 mg. of salt of pyridine with p-toluenesulfonic acid and 4.6 ml. of cyclopentanone dimethyl acetal, and the mixture is boiled for 10 hours. During the boiling, the distilled liquid is removed with water separator, while carbon tetrachloride is added dropwise to the reaction mixture, to maintain the original volume of the reaction mixture. After cooling, the mixture is mixed with 2 ml. of pyridine and evaporated in vacuo at room temperature. The residue is chromatographed over 160 g. of alumina containing 3% of water, and the fraction eluted with petroleum ether is recrystallized twice from a mixture of ether and methanol to afford 1.352 g. of 17β-(1-cyclopentenyl)-oxy-2α,3α-epithio-5α-androstane, M.P. 129–131° C.

EXAMPLE 2

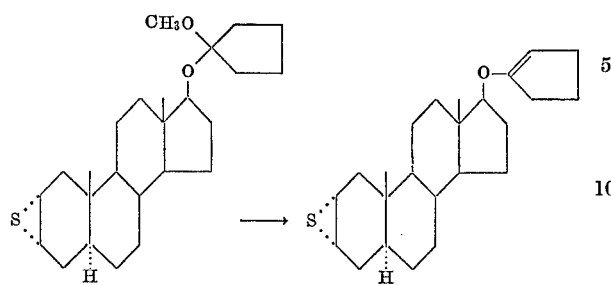

A solution of 1.0 g. of 17β-(1-methoxycyclopentyl)oxy-2α,3α-epithio-5α-androstane (French Pat. No. 1,554,967) in 10 ml. of pyridine is heated at 80° C. for two hours under reduced pressure. The reaction mixture is poured into iced water, and extracted with methylene chloride. The extract solution is washed with water, dried and evaporated. The residue is recrystallized from a mixture of methanol and ether to give 0.529 g. of 17β-(1-cyclopentenyl)oxy-2α,3α-epithio-5α-androstane.

EXAMPLE 3

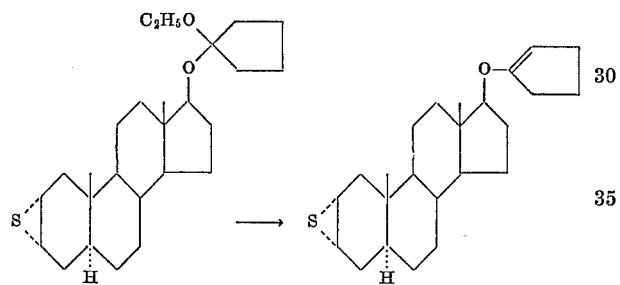

A solution of 1.0 g. of 17β-(1-ethoxycyclopentyl)oxy-2α,3α-epithio-5α-androstane in 10 ml. of carbon tetrachloride containing 1 ml. of pyridine is refluxed for two hours. The reaction mixture is evaporated to dryness, and recrystallization of the residue from a mixture of acetone and hexane affords 0.728 g. of 17β-(1-cyclopentenyl)oxy-2α,3α-epithio-5α-androstane.

EXAMPLE 4

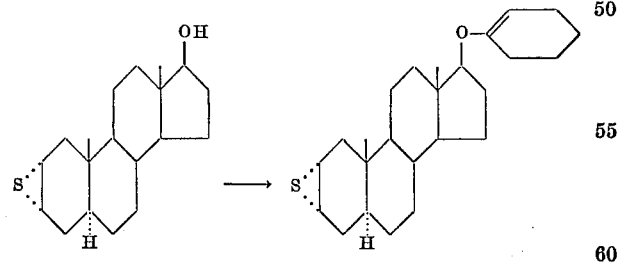

To a solution of 2.0 g. of 2α,3α-epithio-5α-androstan-17β-ol in 60 ml. of carbon tetrachloride are added 20 mg. of salt of pyridine with p-toluenesulfonic acid and 4.6 ml. of cyclohexanone enol methyl ether, and the mixture is boiled for 10 hours. During the boiling, the distilled liquid is removed with water separator, while carbon tetrachloride is added dropwise to the reaction mixture. After cooling, the mixture is mixed with 2 ml. of pyridine and evaporated in vacuo at room temperature. The residue is chromatographed over 160 g. of alumina containing 3% of water, and the fraction eluted with petroleum ether is recrystallized twice from a mixture of ether and methanol to afford 1.247 g. of 17β-(1-cyclohexenyl)oxy-2α,3α-epithio-5α-androstane, M.P. 101-102° C.

EXAMPLE 5

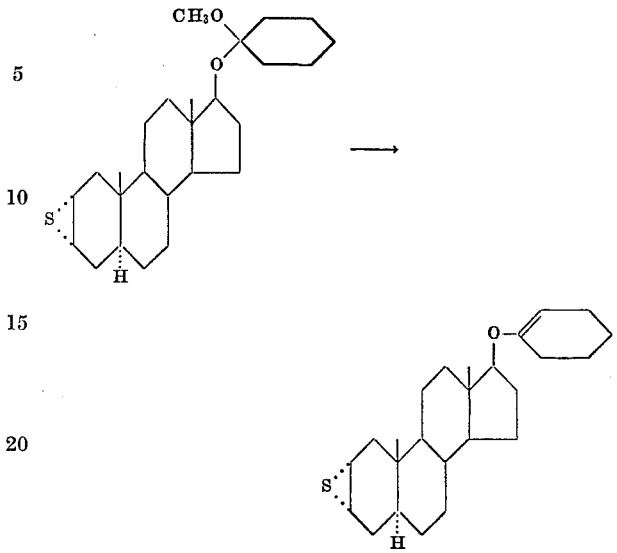

A solution of 1.0 g. of 17β-(1-methoxycyclohexy)oxy-2α,3α-epithio-5α-androstane in 10 ml. of chloroform containing 1 ml. of pyridine is refluxed for 2 hours. The reaction mixture is evaporated to dryness, and recrystallization of the residue from a mixture of acetone and hexane affords 0.635 g. of 17β-(1-cyclohexenyl)oxy-2α,3α-epithio-5α-androstane.

EXAMPLE 6

In a similar manner as Example 1, 2α,3α-epithio-5α-androstan-17β-ol is converted into 17β-(1-cycloheptenyl)oxy-2α,3α-epithio-5α-androstane and 17β-(3-methylcyclohex-1-enyl)oxy-2α,3α-epithio-5α-androstane by reaction with cycloheptenone enol methyl ether and 3-methylcyclohexanone dimethylketal.

EXAMPLE 7

A solution in oil for intramuscular injection, composed of 10 mg. of 17β-(1-cyclopentenyl)oxy-2α,3α-epithio-5α-androstane in 1 ml. of anhydrous sesame oil is prepared by sterilized procedure and administered once a week to a patient.

EXAMPLE 8

A capsule, containing a solution of 5 mg. 17β-(1-cyclopentenyl)oxy-2α,3α-epithio-5α-androstane in 0.25 ml. of anhydrous sesame oil or isopropyl myristate and a stabilizer e.g. ethylamine or trihydroxy-tert-butylamine, is given to a patient.

EXAMPLE 9

A tablet is prepared in per se conventional manner from 50 mg. of microcrystalline cellulose, 10 mg. of arginin, a small amount of magnesium stearate and coated enterically.

What we claim is:
1. Compounds of the general formula:

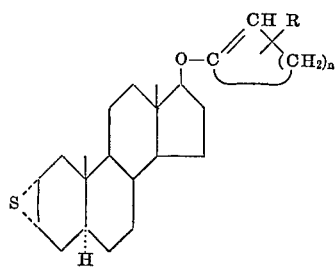

wherein R represents a hydrogen atom or a lower alkyl group and $n$ is an integer of from 3 to 5.

2. A compound according to claim 1, wherein 17β-(1-cyclopentenyl)oxy-2α,3α-epithio-5α-androstane.

3. A compound according to claim 1, wherein 17β-(1-cyclohexenyl)oxy-2α,3α-epithio-5α-androstane.

4. A compound according to claim 1, wherein 17β-(1-cycloheptenyl)oxy-2α,3α-epithio-5α-androstane.

5. A compound according to claim 1, wherein 17β-(3-methylcyclohex-1-enyl)oxy - 2α,3α - epithio-5α-androstane.

6. A process for preparation of a compound according to claim 1, which comprises reaction of 2α,3α-epithio-5α-androstan-17β-ol with a compound of the formula:

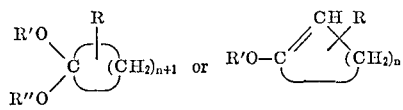

wherein R represents a hydrogen atom or a lower alkyl group; $n$ is an integer from 3 to 5; R' and R" each represents a lower alkyl group, benzyl group or phenyl group; or R' and R" combined together represent a lower alkylene group, in the presence of an acid capable of facilitating the ether formation.

7. A process according to claim 6, wherein the reaction is carried out under anhydrous condition.

8. A process according to claim 6, wherein the reaction is carried out at temperature of range from 50° C. to 100° C.

9. A process for preparation of a compound according to claim 1, which comprises heating of a compound of the formula:

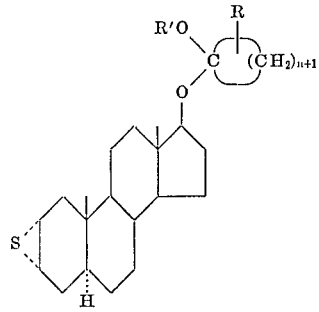

wherein R represents a hydrogen atom or a lower alkyl group, R' represents a lower alkyl group, benzyl group or phenyl group, and $n$ is an integer of from 3 to 5.

10. A process according to claim 9, wherein the reaction is carried out in the presence of pyridine and the reaction temperature is from 50° C. to 100° C.

References Cited
UNITED STATES PATENTS 3,301,850   1/1967   Klimstra _____ 260—239.5

HENRY A. FRENCH, Primary Examiner

U.S. Cl. X.R.

424—241